United States Patent Office 2,840,591
Patented June 24, 1958

2,840,591

PREPARATION OF POTASSIUM DINITRO-CYANOMETHIDE

William V. Brown, Springfield, Mass., assignor to Rohm & Haas Company, Philadelphia, Pa., a corporation of Delaware No Drawing. Application September 6, 1956
Serial No. 608,184

2 Claims. (Cl. 260—465.1)

This invention concerns a process for preparing potassium dinitrocyanomethide and other of the less soluble dinitrocyanomethides.

There has recently arisen a need to prepare dinitrocyanomethides in good yields and in good purities. These compounds have been found useful as ingredients in combustible and explosive mixtures to improve their burning rate.

The process for making dinitrocyanomethides starts with cyanoacetic acid which on nitration gives $CN \cdot C(NO_3)_3$, which must be reduced. This has heretofore been accomplished with hydrogen bromide to provide the acid form $CN \cdot C(NO_2)_2H$, which is a quite unstable material and which when converted with potassium hydroxide yields potassium dinitrocyanomethide. This product is contaminated, however, with considerable proportions of potassium bromide which must be extracted. There may be some potassium nitroform appearing in the products thus prepared which makes the product unstable. It has now been discovered that potassium dinitrocyanomethide can be prepared in excellent purity, in a good physical form, and in high yields with good economy and efficiency by mixing trinitroacetonitrile with ethanol and an aqueous potassium bromide solution. The potassium dinitrocyanomethide which forms is separated and, if desired, purified, as by washing or recrystallization.

At least one mole of potassium bromide is used per mole of trinitroacetonitrile, proportions of about one to three moles of this salt per mole of trinitroacetonitrile being permissible. The salt may be supplemented with hydrogen bromide to render the system acidic, since somewhat better yields seem to be obtained under distinctly acidic conditions even though potassium present is fully equivalent to the dinitrocyanomethide formed. The potassium bromide is dissolved in at least enough water to ensure its solubility in the reaction mixture. There is nothing particularly critical about the amount of water. Usually from 250 ml. to 1000 ml. per gram mole of potassium bromide is used.

The amount of ethanol used is in general in proportion to the amount of starting material. About 150 to 2500 ml. of alcohol is generally used per gram mole of trinitroacetonitrile. While ethanol is preferred as a water-miscible alcohol, it may be replaced in part or as a whole with one or more of the other lower water-soluble alkanols.

Carbon tetrachloride has been found to be a particularly useful solvent for the trinitroacetonitrile, one gram mole of which may be dissolved in about 900 to 1800 ml. of this solvent. Other inert, volatile organic solvents can be substituted for it. The chief consideration here is that the solution be dilute enough to prevent separation of the starting material.

Reaction between the solution of trinitroacetonitrile and the alcohol-water solution of potassium bromide is effected between about 35° and 60° C. In this temperature range reaction becomes complete in less than two hours, usually one half to one hour being sufficient.

Further details of the process of this invention are presented in the following examples which are given for purposes of illustration and not by way of limitation.

*Examples*

(1) There were mixed 700 ml. of 95% ethyl alcohol and a solution of 238 grams of potassium bromide in 550 ml. of water. This mixture was charged to a reaction vessel equipped with a water-cooled reflux condenser, thermometer, stirrer, and a bath for supplying cooling or heating. To the contents of the reaction vessel there were added with stirring over a period of about four minutes a solution of 176 grams of trinitroacetonitrile in 369 ml. of carbon tetrachloride, while the temperature of the materials in the reaction vessel varied from 35° to 48° C. The reaction was mildly exothermic and precipitation of product began almost immediately. The temperature of the reaction mixture was held between 45° and 57° C. with the aid of external cooling for an hour, during which time there was some refluxing of carbon tetrachloride and water. The reaction mixture was cooled to 0° C. and filtered. The filtered cake was washed with about 100 ml. of ethyl alcohol and dried under reduced pressure. The filter cake was then found to consist of 147 grams of potassium dinitrocyanomethide and 13 grams of potassium bromide. The bromide was extractable with water to give an essentially pure end product.

(2) To a reaction vessel equipped with thermometer, reflux condenser, stirrer, and a bath for cooling and heating there were charged 3500 ml. of denatured 95% ethyl alcohol, 834 grams of 48% hydrobromic acid, 580 grams of potassium bromide, and 840 ml. of hot water. This mixture was thoroughly stirred. Thereto was added a solution of 1786 grams of trinitroacetonitrile in 7113 ml. of carbon tetrachloride with the temperature of the reaction mixture changing from 37° to 34° C. Reaction began promptly with a slight evolution of heat which raised the temperature of the mixture to 45° C. in about eight minutes. The temperature of the reaction mixture was held for about 45 minutes between 45° and 54° C. with occasional heating. The reaction mixture was filtered. The filter cake was washed with a mixture of 300 ml. of water and 300 ml. of methanol and then with 300 ml. of methanol. The solid product was then recrystallized from water, the solid being dissolved with hot water and the solution held at 0° C. for crystallization. The recrystallized product was dried under low pressure to give 1667 grams of pure potassium dinitrocyanomethide, a 97.1% yield.

There are many advantages of the process of this invention. It is simple, direct, and economical, since it does not require the more expensive hydrobromic acid as a primary reactant and the subsequent use of potassium hydroxide for converting the dinitroacetonitrile into its potassium form. The process is safe, particularly in that it avoids formation of unstable dinitroacetonitrile and any appreciable proportion of potassium nitroform. The quality of the product is excellent in good yields.

I claim:

1. A process for preparing potassium dinitrocyanomethide which comprises mixing trinitroacetonitrile with ethanol and an aqueous potassium bromide solution, reacting the resulting mixture between 35° and 60° C., and separating potassium dinitrocyanomethide.

2. A process for preparing potassium dinitrocyanomethide which comprises mixing a solution of trinitroacetonitrile in carbon tetrachloride with ethanol and an aqueous potassium bromide solution, reacting the resulting mixture between 35° and 60° C., and separating potassium dinitrocyanomethide.

No references cited.